United States Patent [19]

Hill

[11] 4,433,578
[45] Feb. 28, 1984

[54] WHEEL CLAMPING NUT WITH FREELY ROTATING INSERT

[75] Inventor: Ronald L. Hill, Conway, Ark.

[73] Assignee: FMC Corporation, Chicago, Ill.

[21] Appl. No.: 326,105

[22] Filed: Nov. 30, 1981

Related U.S. Application Data

[63] Continuation of Ser. No. 100,620, Dec. 5, 1979, abandoned.

[51] Int. Cl.³ .......................................... G01M 1/06
[52] U.S. Cl. ................................... 73/487; 411/435; 411/534; 157/21
[58] Field of Search .............. 73/487; 411/435, 432, 411/427, 534; 157/14, 17, 20, 21

[56] References Cited

U.S. PATENT DOCUMENTS

| | | | |
|---|---|---|---|
| 1,393,459 | 10/1921 | Smith | 411/435 |
| 3,392,728 | 7/1968 | Bone et al. | 128/346 |
| 4,168,627 | 9/1979 | Held et al. | 73/487 |

FOREIGN PATENT DOCUMENTS

| | | | |
|---|---|---|---|
| 17508 | of 1910 | United Kingdom | 411/435 |
| 11351 | of 1911 | United Kingdom | 411/435 |
| 178448 | 7/1923 | United Kingdom | 411/435 |

Primary Examiner—E. R. Kazenske
Assistant Examiner—J. Chapman
Attorney, Agent, or Firm—H. M. Stanley; R. B. Megley

[57] ABSTRACT

A wing nut with a threaded axial passage is adapted to engage the threads on the horizontal balancing shaft of a wheel balancer having an abutment thereon. A wheel to be balanced is placed on the shaft and is arranged to be held in tight engagement with the abutment when the wing nut is threaded on the shaft. The surface of the wing nut which forces the wheel against the abutment is recessed with a cylindrical recess. A plastic insert is adapted to be retained within the cylindrical recess and has a central bore which is aligned with the threaded passage in the nut to permit the balancing shaft to pass therethrough. The insert projects axially from the nut body so that the insert, rather than the nut body, will engage the member which is holding the wheel against the abutment. A plurality of ball bearings are retained along the radially extended opposed faces of the insert and the nut within the cylindrical recess in the nut body allowing the insert to rotate freely with respect to both the nut body and the shaft upon which the nut is threaded.

3 Claims, 3 Drawing Figures

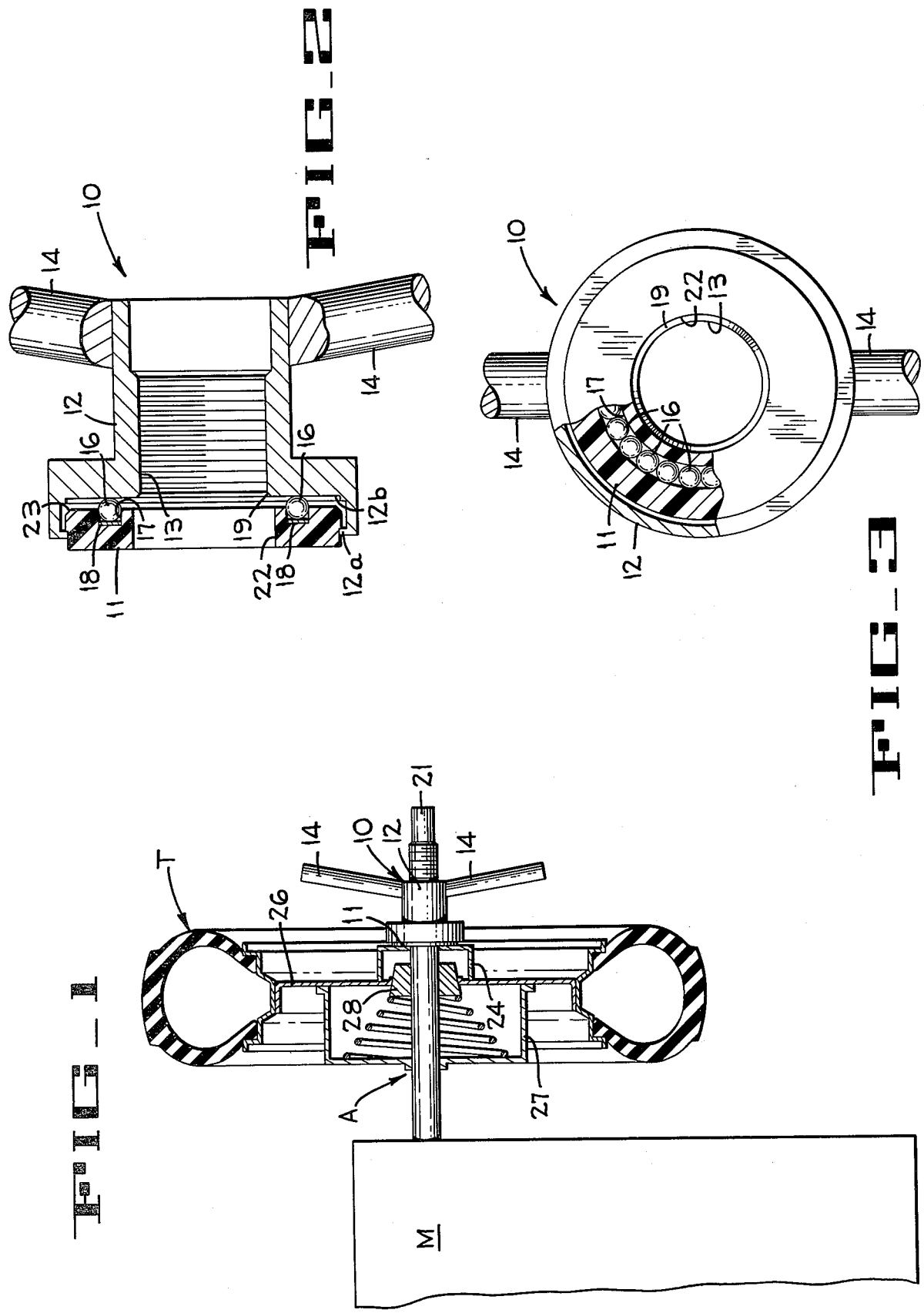

WHEEL CLAMPING NUT WITH FREELY ROTATING INSERT

This application is a continuation of application Ser. No. 100,620, Filed Dec. 5, 1979 and now abandoned.

BACKGROUND OF THE INVENTION

1. Field of the Invention

The present invention pertains to nuts, and more particularly, it pertains to a wing nut for fastening a vehicle wheel to the rotatable shaft of a wheel balancer or other wheel rotating apparatus.

2. Description of the Prior Art

Whell balancing machines having a horzontally projecting rotatable spindle have been used in the automotive servicing industry for a number of years. It is desirable on such machines to be able to mount the wheel directly on the horizontal spindle in a manner such that the spindle projects through the center hole of the wheel with the wheel being positioned against an abutting surface that is rotatable with the spindle. The wheel can then be secured by means of a single nut threaded directly onto the spindle rather than by securing numerous individual lug nuts. Such a wheel mounting apparatus is disclosed in U.S. Pat. No. 3,889,542 to Carrigan issued June 17, 1975.

The above-mentioned prior art displays two objectionable features. First, when securing the wing nut in order to firmly position the wheel on the spindle, the friction between the nut and the wheel makes it difficult to adequately tighten the nut. Failure to adequately tighten the nut often brings about a second problem during operation of the balancer. Normally, rotational force is transmitted to the wheel through a backing plate and a retainer cup which hold the opposite faces of the wheel (see FIG. 1 of the drawings herein, items 27 and 24 respectively). If, however, the nut has not been adequately tightened, the friction between said holding members and the wheel may be insufficient and the wheel may slip relative to the rotary motion of the spindle. When this occurs, the inertia of the wheel is transmitted to the nut through the retainer cup and the nut is prevented from rotating at the same angular velocity as the spindle. In this manner, the nut will unthread and may disengage from the spindle.

SUMMARY OF THE INVENTION

The present invention solves the problems just described by providing a nut for fastening a wheel onto a rotatable shaft on a wheel balancing machine so that the wheel is securely held between the nut and an abutment on the shaft. A threaded nut body is adapted to engage threads on the shaft. A recess is formed at one end of the nut body wherein a radially extending face defines the bottom of the recess. A relatively resilient insert is formed to fit and be retained within the recess. The insert has a center bore to accommodate passage of the shaft and projects axially from the nut body so that the insert will engage the wheel or a wheel holding member without allowing contact by the nut body. The wheel is thereby forced against the abutment. The insert has a radially extending face with an annular raceway formed thereon. A relatively nonresilient annular backing plate is disposed in the bottom of the raceway. A relatively frictionless bearing is disposed in the raceway operating to separate the radially extending opposed faces of the nut body and the insert. The insert may therefore rotate freely relative to the nut body when the insert is compressed into the recess as the nut is turned onto the shaft threads to thereby lock the nut in engagement with the wheel or the holding member. This leads to two beneficial results. First, it is much easier to tighten down on the nut and thus insure sufficient clamping force between the wheel and its holding members so that the wheel will spin as desired. Second, even if the wheel slips relative to the spindle, the inertia of the wheel will be transmitted to the insert only and will not be transmitted to the threaded nut body; thus, no torque opposite to the direction of rotation of the spindle is transmitted to the nut from the wheel and the nut body rotates with the spindle. The nut body will not unthread and the insert will be free to turn harmlessly relative thereto.

It is therefore the object of the present invention to provide a clamping nut which may be tightened with minimum friction between the nut and the secured entity.

Another object is to provide a nut employed on a threaded rotating shaft which nut will not be affected by the inertia of the secured entity.

BRIEF DESCRIPTION OF THE DRAWINGS

FIG. 1 is a diagrammatic central section of a vehicle wheel mounted on the horizontal wheel balancing spindle of a wheel balancer illustrating the manner in which the wing nut of the present invention abuts the wheel holding assembly.

FIG. 2 is a diagrammatic central section of the wing nut.

FIG. 3 is an end view of the wing nut with a portion thereof being broken away illustrating the placement of the insert.

DESCRIPTION OF THE PREFERRED EMBODIMENT

A nut 10 with a freely rotating insert 11 (FIG. 2) will be described in connection with a wheel and tire assembly T, a wheel mounting apparatus A, and a wheel balancing machine M, all shown in FIG. 1.

The nut 10 (FIG. 2) includes a nut body 12 with an internally threaded hole 13 extending axially therethrough. Wing members 14 project outwardly from the nut body 12 for facilitating the securement of the nut, and a plastic insert 11 is retained within a cylindrical recess 12b at one end of the nut body so as to project outward from that end of the body. The insert may be formed, for example, of a molded polypropylene material. As shown in FIG. 2, the outer end of the nut body is provided with a thin, radially inwardly extending annular lip 12a that receives a stepped portion of the plastic insert in order to retain the insert within the recess 12b. There is no contact between the annular lip 12a and the plastic insert when the wing nut is in use and the plastic insert is compressed into the recess 12b, as described below. A plurality of ball bearings 16 are retained within a annular bearing receway 17 impressed into the insert on its inner radially extending face, and a metal backing plate 18 is provided at the bottom of the bearing raceway. The bearings are thus secured between the opposed faces of the insert and the nut body to provide a relatively low friction coupling therebetween. A dry lubricant is applied to both the ball bearings and the metal backing plate prior to insertion into the nut body. A dry lubricant, rather than a wet lubricant is used to avoid the accumulation of dirt and grit on the bearing surfaces.

The entrance to the threaded center hole 13 in the nut body is chamfered at 19 to facilitate threading onto a horizontal spindle 21 (FIG. 1) of the wheel balancing machine M. The plastic insert 11 is bored through the center (FIGS. 2 and 3) so that the circumference of the resulting circular hole 22 is concentric with and slightly larger than the threaded hole 13 through the nut body 12 (FIGS. 2 and 3). This is done so that the insert 11 will not contact the horizontal spindle 21 (FIG. 1) when the nut is in place on said spindle. The perimeter of the insert is chamfered at 23 to facilitate insertion into the nut body, and the insert is arranged to be pressed into the recess in the nut body so that the stepped portion of the insert is secured by the annular lip 12a of the nut body.

The plurality of ball bearings 16 placed between the nut body 12 and the plastic insert 11 function to minimize the friction between said nut body and said insert when the insert is compressed into the recess 12b where it is retained in the nut body. Such compression occurs when the nut is tightened causing the insert to press against an adjoining surface. In the embodiment of the invention shown, this occurs as the nut is tightened against the wheel holding member 24 (FIG. 1) which is turn presses against the hub of the wheel 26. Thus the wheel is forced against the backing plate 27 which is attached to the rotatable spindle 21. It is through the backing plate that rotational force is transmitted to the wheel. A spring-loaded centering cone 28 serves to correctly position the wheel in a plane transverse to the spindle.

The nut 10, therefore, must be tightened sufficiently to cause adequate friction between the backing plate 27 and the wheel 26 to transmit rotational force from the spindle 21. The task of tightening the nut 10 is facilitated since the nut body 12 (FIG. 2) turns independently of the insert 11 which contacts the wheel holding member 24 (FIG. 1).

The second object of this invention is to prevent the nut 10 from unthreading from the spindle 21 when the nut has not been adequately tightened as pointed out hereinbefore. This may occur when insufficient force is transmitted from the spindle through the backing plate 27 to allow the wheel and tire assembly T to remain stationary or to rotate less rapidly than the spindle. Without the presence of the freely rotating insert 11, the nut would be prevented from turning with the spindle by the counter torque introduced in the nut by the wheel holding member 24 against which the nut is pressed. The wheel holding member contacts the wheel 26 and rotates at the same speed. The differential rotation between the nut and the spindle thus provided could easily cause the nut to unthread from the spindle. The inclusion of the freely rotating insert cures this problem. The inertia of the wheel is only transmitted as far as the insert which is free to rotate relative to the spindle. The nut body turns with the spindle and does not unthread.

Although the best mode contemplated for carrying out the present invention has been herein shown and described, it will be apparent that modification and variation may be made without departing from what is regarded to be the subject matter of the invention.

What is claimed is:

1. In a dynamic wheel balancer having a driven threaded wheel-mounting shaft carrying thereon a wheel backing plate for engaging and driving a wheel mounted on said shaft at high speed in a balancing operation a wheel holding member carried by said shaft and a clamping nut having threaded engagement with said shaft to clamp the wheel between the wheel backing plate and said wheel holding member the improvement comprising,
   said nut having a threaded bore merging at one end into an outwardly radially extending annular face terminating in an axial projection with an inwardly projecting retaining lip,
   an annular resilient insert having a bore for said shaft and having a smaller diameter portion extending axially outwardly from said lip terminating in an outer radial face for engagement with said wheel holding member on said shaft, and further having a larger diameter portion inwardly of said lip terminating in an inner radial face in spaced relation to said nut radial face, thereby to loosely retain said insert in association with said nut,
   said inner radial face having an annular raceway formed therein and having a nonresilient backing plate in the bottom of said raceway, and,
   bearing members in said raceway engaging said nonresilient plate and said nut radial face thereby to space said insert from said nut radial face and permit substantially free rotation of said nut in clamping a wheel on said shaft while said insert frictionally engages said wheel holding member to be substantially stationary with respect thereto,
   thereby firmly clamping said wheel for balancing while precluding unthreading torque forces on said nut.

2. The improved dynamic wheel balancer of claim 1 wherein said bearing members comprise ball bearings.

3. The improved wheel balancer of claim 1 wherein said insert is formed of molded polypropylene.

* * * * *